(12) United States Patent
Parker et al.

(10) Patent No.: US 8,510,459 B2
(45) Date of Patent: Aug. 13, 2013

(54) METHOD AND SYSTEM FOR TRANSMITTING A DATA FILE OVER A DATA NETWORK

(75) Inventors: Bruce Parker, Mt Colah (AU); Robert Ward Holder, Hornsby (AU)

(73) Assignee: PacByte Software Pty Limited, Epping NSW (AU)

( * ) Notice: Subject to any disclaimer, the term of this patent is extended or adjusted under 35 U.S.C. 154(b) by 837 days.

(21) Appl. No.: 12/439,665

(22) PCT Filed: Aug. 31, 2007

(86) PCT No.: PCT/IB2007/053509
§ 371 (c)(1),
(2), (4) Date: May 11, 2009

(87) PCT Pub. No.: WO2008/026186
PCT Pub. Date: Mar. 6, 2008

(65) Prior Publication Data
US 2009/0319536 A1    Dec. 24, 2009

Related U.S. Application Data

(60) Provisional application No. 60/824,391, filed on Sep. 1, 2006.

(51) Int. Cl.
*G06F 15/16* (2006.01)
(52) U.S. Cl.
USPC .......................................... 709/231; 709/219
(58) Field of Classification Search
USPC ....................................................... 709/231
See application file for complete search history.

(56) References Cited

U.S. PATENT DOCUMENTS 6,085,251 A * 7/2000 Fabozzi, II .................... 709/230
6,301,604 B1   10/2001 Nojima
6,735,634 B1 * 5/2004 Geagan et al. ................ 709/235

(Continued)

FOREIGN PATENT DOCUMENTS

WO   WO 03/045030         5/2003
WO   WO 2005039057 A1 *   4/2005

OTHER PUBLICATIONS

"Thread Pools". From "The Java Tutorial", Sun Microsystems. Archived by the Internet Archive on Mar. 3, 2005: <http://web.archive.org/web/20050303013407/http://java.sun.com/docs/books/tutorial/essential/threads/group.html>. pp. 1-5.*

(Continued)

*Primary Examiner* — Christopher Biagini
(74) *Attorney, Agent, or Firm* — Woodcock Washburn LLP

(57) ABSTRACT

In one form the invention provides a method of modifying a data file for transmission over a data network. The method comprises the steps of receiving the original data file and creating a header file, the header file including the length in bytes of the original data file. At least one repetition byte sequence is identified within the original data file, the repetition byte sequence comprising a byte value that is repeated consecutively within the repetition byte sequence. A modified data file is created by replacing the repetition byte sequence with a repetition marker, the repeated byte value, and a repeat frequency value representing the number of times the repeated byte value occurs within the repetition byte sequence. The repetition marker is added to the header file. The invention further provides a method of transmitting a data file to a remote device over a data network.

32 Claims, 7 Drawing Sheets

(56) References Cited

U.S. PATENT DOCUMENTS

| | | |
|---|---|---|
| 6,877,039 B2 * | 4/2005 | Larson et al. ............... 709/237 |
| 6,970,939 B2 | 11/2005 | Sim |
| 6,978,423 B2 * | 12/2005 | Seetharaman et al. ........ 715/764 |
| 7,076,553 B2 | 7/2006 | Chan et al. |
| 7,159,030 B1 * | 1/2007 | Elzur ............................ 709/238 |
| 7,180,896 B1 * | 2/2007 | Okumura ..................... 370/394 |
| 2002/0120753 A1 * | 8/2002 | Levanon et al. ............. 709/228 |
| 2004/0177165 A1 * | 9/2004 | Masputra et al. ............ 709/250 |
| 2005/0066063 A1 * | 3/2005 | Grigorovitch et al. ............ 710/1 |
| 2005/0108554 A1 * | 5/2005 | Rubin et al. .................. 713/187 |
| 2006/0109856 A1 * | 5/2006 | Deshpande ................... 370/412 |

OTHER PUBLICATIONS

Microsoft Corporation, "Web Server vs. Streaming Media Server", Jan. 19, 2003, http://web.archive.org/web/20030119092241/http://www.microsoft.com/windowsmeida/compare/webservvstrearnserv.aspx>, 3 pages.

* cited by examiner

METHOD AND SYSTEM FOR TRANSMITTING A DATA FILE OVER A DATA NETWORK

CROSS-REFERENCE TO RELATED APPLICATIONS

This application is the National Stage of International Application No. PCT/IB2007/053509 filed Aug. 31, 2007, which claims the benefit of U.S. Provisional Application No. 60/824,391 filed Sep. 1, 2006, the disclosures of which are incorporated herein by reference in their entireties.

FIELD OF INVENTION

The present invention relates to methods for transmitting a data file to a remote device over a data network. More particularly but not exclusively it relates to methods for streaming audio and/or video data files.

BACKGROUND TO THE INVENTION

Electronic binary files exist in many different formats for many different uses. These formats include formats suitable for storage of image, sound, text, data, executable files and so on.

Electronic binary audio and video files are available in several different data formats. Some use lossless compression such as WAV and AVI. Others that use lossey compression include MP2, MP3 and others.

These data formats are suited to being played on remote devices such as personal computers, portable devices and other hardware. Data files are able to be transmitted over the internet or other data network to be accessed, stored or played at a later time or date. Some of the formats are able to be transmitted in a way that enables part of the data file to be played or accessed on the remote device while the remainder or at least a further portion of the data file is transmitted to the remote device. This latter method of transmission is known as streaming.

Traditionally, electronic binary files used for streaming audio or video use high levels of lossey compression to reduce the size of the files transmitted over the data network. This high level of lossey compression delivers a severe drop in the quality of the audio or video being delivered. In the case of video, quality drop is not as apparent on portable devices as the playback screens are so small. Less data needs to be transmitted to playback on these small screens.

It is an object of the present invention to provide an improved or alternative method of streaming data files including binary audio and video files, or to at least provide the public with a useful choice.

SUMMARY OF THE INVENTION

In one form the invention comprises a method of modifying a data file for transmission over a data network. The method comprises the steps of receiving the original data file and creating a header file, the header file including the length in bytes of the original data file. At least one repetition byte sequence is identified within the original data file, the repetition byte sequence comprising a byte value that is repeated consecutively within the repetition byte sequence. A modified data file is created by replacing the repetition byte sequence with a repetition marker, the repeated byte value, and a repeat frequency value representing the number of times the repeated byte value occurs within the repetition byte sequence. The repetition marker is added to the header file.

In another form the invention comprises a method of transmitting a data file to a remote device over a data network, the data file comprising a plurality of ordered data segments and a header file, the header file including a segment frequency value representing the number of segments in the data file. The method comprises the steps of transmitting the header file to the remote device over the data network. The first data segment of the plurality of ordered data segments is transmitted over the data network to the remote device at the request of a first execution thread and the value of a counter value is increased. The second data segment of the plurality of ordered data segments is transmitted over the data network simultaneously to the remote device at the request of a second execution thread and the value of the counter value increased. Subsequent alternate data segments are transmitted over the data network to the remote device at the request of the first and second execution threads, and the value of the counter value is increased following transmission of all or some of the subsequent data segments.

The term "comprising" as used in this specification and claims means "consisting at least in part of". That is to say, when interpreting statements in this specification and claims which include "comprising", features (other than those prefaced by this term in each statement) can also be present. Related terms such as "comprise" and "comprised" are to be interpreted in a similar manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE FIGURES

Preferred forms of the method for transmitting data files over a data network will now be described with reference to the accompanying figures in which.

DETAILED DESCRIPTION

Figure 1:
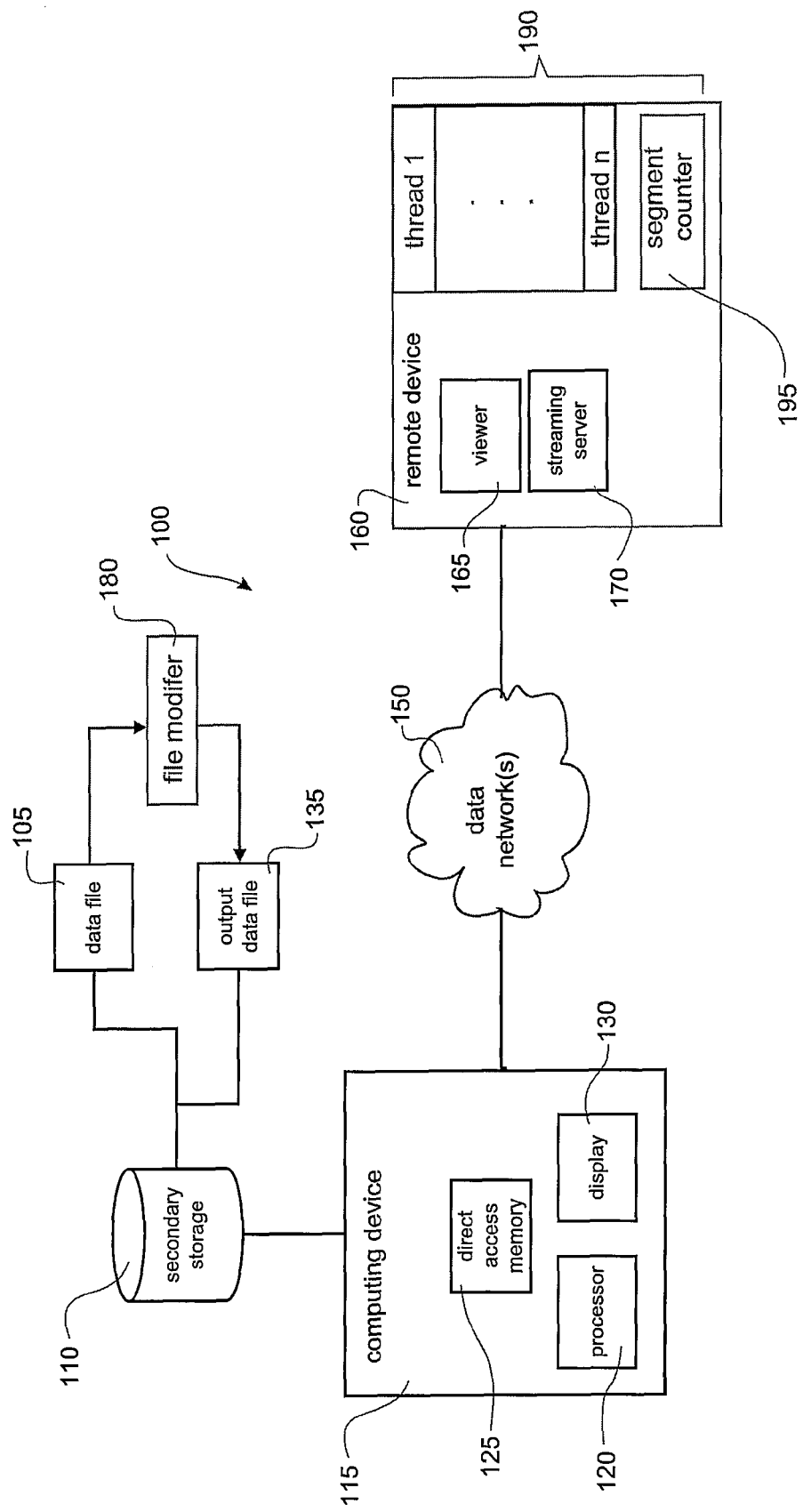
FIG. 1 illustrates one preferred system in which the method is implemented.

FIG. 1 illustrates one preferred form system 100 suitable for transmission of data files over a network. A typical data file 105 may be a binary audio and/or video file. Data file 105 could be in any binary format including WAV, AVI, MP2, MP3, AC3, MP4, H264, Xvid, DivX, WMA, WMV, MOV, VOB, PPT, PPS, DOC, XLS, DOC, ZIP, RAR, PPM etc. Data file 105 is typically stored in secondary storage 110 that forms part of or is at least interfaced to computing device 115. Computing device 115 includes at least processor 120 interfaced to direct access memory 125 and display 130. It will be appreciated that the computing device could include or be interfaced to other components for example a data entry device (not shown) and an output device (not shown).

Described below is one technique for modifying data file 105 to create a modified or output data file 135. Techniques are described below for modifying the original data file 105 prior to transmission over data network or data networks 150. Data networks 150 include the internet and any other suitable network file transmission structure or process. Output data file 135 is transmitted to remote device 160 over the data networks 150.

Remote device 160 includes a personal computer, a portable device or any other suitable hardware on which audio and/or video files can be displayed to a user. The remote device 160 typically includes or is interfaced to a viewer component 165 for example Windows Media Player, Real Player, VLC and so on. The viewer component 165 enables binary audio and video data files to be played to a user operating the remote device.

Remote device 160 also includes a streaming server 170. Alternatively the streaming server 170 is located remotely from but associated with remote device 160. The operation of the streaming server will be described in more detail below. The streaming server 170 allows portions or segments of output data file 135 to be transmitted over data network(s) 150 and cached on streaming server 170 for display to a user with viewer 165. Alternatively the transmitted data file is stored on remote device 160.

System 100 further includes a file modifier component 180. File modifier 180 is further described below. It includes a software component maintained in a computer memory.

In one embodiment remote device 160 includes or has associated with it two or more execution threads 190 and a segment counter 195. It is expected that the value of n will be at least two. Each execution thread is configured to handle a new segment as will be described below.

Figure 2:
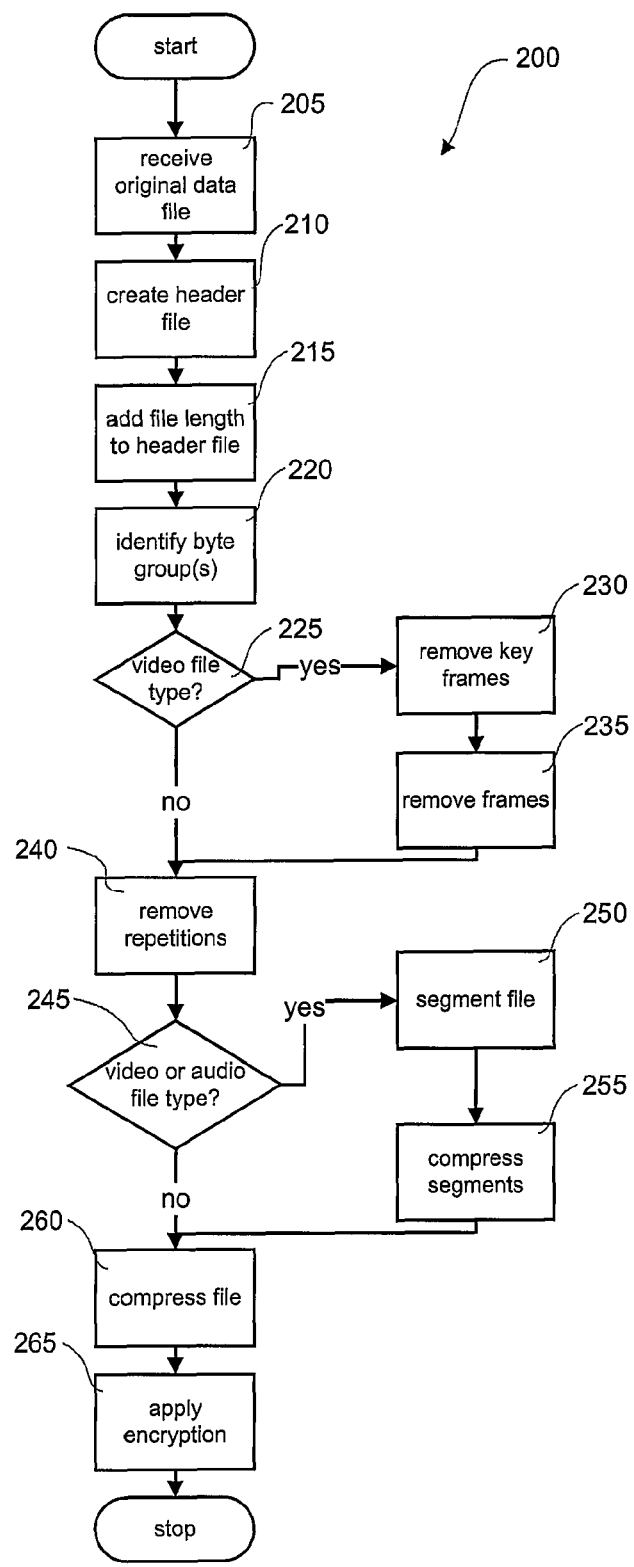
FIG. 2 shows a method of modifying a data file.

FIG. 2 illustrates a preferred form method 200 by which file modifier 180 modifies data file 105 to generate output data file 135. This modification can occur at the time the data file is transmitted or partially transmitted over the data network 150. Alternatively the modification process is performed in advance and stored in secondary storage 110. The secondary storage includes hard drives, computer cache, compact discs, DVDs and so on.

The modification process described below may be applied to a video or audio format either in conjunction with one or more of the alternative methods described below or without. It will be appreciated that other data formats may operate with this modification process or a modification process specific to the characteristics of the data format, as is the case here for video formats. The files can be in any format compatible with the transmission of binary information over a network of any type.

The first step in process 200 is that file modifier 180 receives 205 or at least obtains access to the original data file 105 on which the modification process is applied.

File modifier 180 creates 210 a header file that will contain key information describing the original data file 105 and any modifications made to it. Examples of a suitable header file format are described below.

The length of the original data file in bytes is added 215 to the header file.

Data file 105 is scanned to identify 220 up to three unique 4 byte sequences or byte groups that do not occur in the original data file.

If the data file is a video file type 225 the video file is optionally scanned for key frame points. A key frame is a frame that is encoded without reference to any images in another frame in video data file compression. A key frame in this application is also referred to as an intra frame or I-frame.

An I-frame is often followed by one or more inter-frames that are calculated from the preceding key frame. An I-frame is a picture coded without reference to any picture except itself. An I-frame can be generated by an encoder to create a random access point to allow a decoder to start decoding properly from scratch at that picture location. An I-frame may also be generated when differentiating image details prohibit generation of effective data frames. I-frames typically require more bits to encode than other picture types.

At least some and preferably all the binary data representing key frames are removed 230 and replaced with one of the unique 4 byte sequences.

The video file is optionally further scanned for frames. B-frames are one of three picture types found in typical video compression designs. The three major picture types are referred to as intra pictures, predicted pictures and bi-predictive pictures. Intra pictures, predicted pictures and bi-predictive pictures are all components of video compression design that are well known in the art. All frame information, for example I, B or P pictures or frames, is removed 235 and each occurrence is replaced with another of the unique 4 byte sequences.

For video file types and other file types all repetitions are removed 240. The preferred form data transformation is run length encoding. Sequences of data in which the same byte value is repeated consecutively are replaced with a single occurrence of the byte value followed by a count or frequency value. At least one of these repetition byte sequences is identified within the original data file.

Another of the unique 4 byte sequences that does not occur in the original data file is selected as a repetition marker. The repetition marker when present in a data file signifies a data value to which run length encoding has been applied.

The repetition byte sequence is replaced with the repetition marker, the value of the byte that is repeated and a repeat frequency value. The repeat frequency value represents the number of times that the repeated byte value occurs within the repetition byte sequence. Typically all values that repeat consecutively between 6 and 260 times are removed and replaced with a 6 byte string. This 6 byte string includes the repetition marker, the repeated byte value and a repeat frequency value.

The header file is updated, by writing to the header file the unique 4 byte sequence that functions as a repetition marker. Also written to the header file are the byte sequences representing key frame points and frames respectively where the data file is of a video file type.

Where the file type is a video or audio file type 245, one optional step in the technique is to segment 250 the file. The file is segmented into a series of ordered data segments. The segments can be any size but are typically between approximately 524,288 bytes and 1,572,864 bytes. The segments can each be the same size with a final segment smaller in size. Alternatively each of the segments varies in size.

In one example the file is segmented into equal segments of one megabyte (1,048,576 bytes in length). Alternatively in another form the file is segmented before or after a key frame, a number of key frames, or the first key frame to appear after a one megabyte sequence. Segmenting the file on key frames enables the insertion of other segments from other video files. The header file is updated by inserting into the header file the number of segments making up the data file.

It will be appreciated that the data file could be segmented in a way that results in more than one separate file segment maintained as separate data files. Alternatively the data file is maintained as a single data file. Individual data segments are created as needed by reading from different offsets within the data file.

A further optional step is to apply one or more data transformation techniques to some or all of the segments. Some of these data transformation techniques include data compression 255 of one or more segments.

In a first preferred form data compression technique, individual segments are divided into blocks, each block no larger than 256 bytes. The data compression technique is described further below with reference to FIG. 5. These blocks are sub-sequences of individual segments. If an individual block has more than 128 unique byte values, then a data transformation is applied to the block to increase the frequency of unique byte values in the block to either 128 or fewer or 256 unique values. The data transformation involves applying one or more transformation data sets or masks to each of the values in the block multiple times. It is envisaged that up to 65,535 different transformation data sets are available to be applied to individual blocks.

If 256 unique values can be achieved in an individual block then the relevant permutation is written back to the data file. This can be achieved in 210.5 bytes. If 128 or fewer unique values are achieved then this is written back in 224 bytes.

If neither 256 nor 128 or fewer unique values are achieved then the overlay or mask value is written as zero or null meaning that the relevant binary information does not require decoding or decompressing.

The above compression technique is described further in our patent specification published as WO 2005/039057 titled "Data Compression System and Method" that is hereby incorporated by reference.

Alternatively, or in addition, a second preferred form data compression technique is applied to one or more segments. This second data compression technique is described further below with reference to FIG. 6. The entire segment is scanned and the number of occurrences of each byte value is retained. A substitution is then made where the most repeated byte value is substituted with a byte value of 0. The next most repeated value is substituted with a byte value of 1 and so on until the least repeated byte value is substituted with a byte value of 255. The segment will then be structured in such a way that the most common values are the lower byte values. A table of the original byte values and the substitute values requires 512 bytes and is added to the header file.

Alternatively, or in addition, a third preferred form data compression technique is applied. This is further described with reference to FIG. 7. This technique is a variation of our patent specification published as WO 2005/039057 titled "Data Compression System and Method". A segment may be broken into groups of byte sequences. A single data transformation set is applied to each of these segments repetitively until a predetermined number of unique values occur within each data segment.

In one example a file is broken into 256 byte sequences, and a data transformation of 0, 1, 2, 3, 4 . . . 255 is applied to each byte value in order. This data transformation is applied in a similar manner to the second data compression technique described above. The byte sequence is then scanned and a count of the unique number of byte values is made. In this example 162 unique values is being sought (162 unique values occur in approximately 7.9% of all possible structures of 256 bytes), however this value may be varied. If 162 unique byte values are not identified within a segment then the same data transformation is applied over the same segment again and the process is repeated. Once 162 unique values have been identified the number of times the transformation mask was applied is recorded. The value recording the number of transformations may be written to an index file, header file or included at the beginning or end of the 256 transformed byte values.

The data sequence now contains a known sub-set of all possible combinations of the sequence size. This subset may be recorded as the byte value transformations or as an index value. In the case of 162 unique values the number of values required to create an index is approximately 7.9% of the total number of possible structures of 256 values.

The size of the byte segments may vary. The number of unique values identified may vary. The number of unique values identified within a segment may be fixed at a set number, it may be that number or less, or that number or more.

Alternatively, or in addition, the entire data file modified or unmodified using any combination of the above methods may have a lossless compression technique applied to it 260.

A further additional step is to apply encryption 265 to an entire file or alternatively individual encryption functions can be applied to individual segments where a video or audio file is involved and that file has been segmented.

Figure 3:
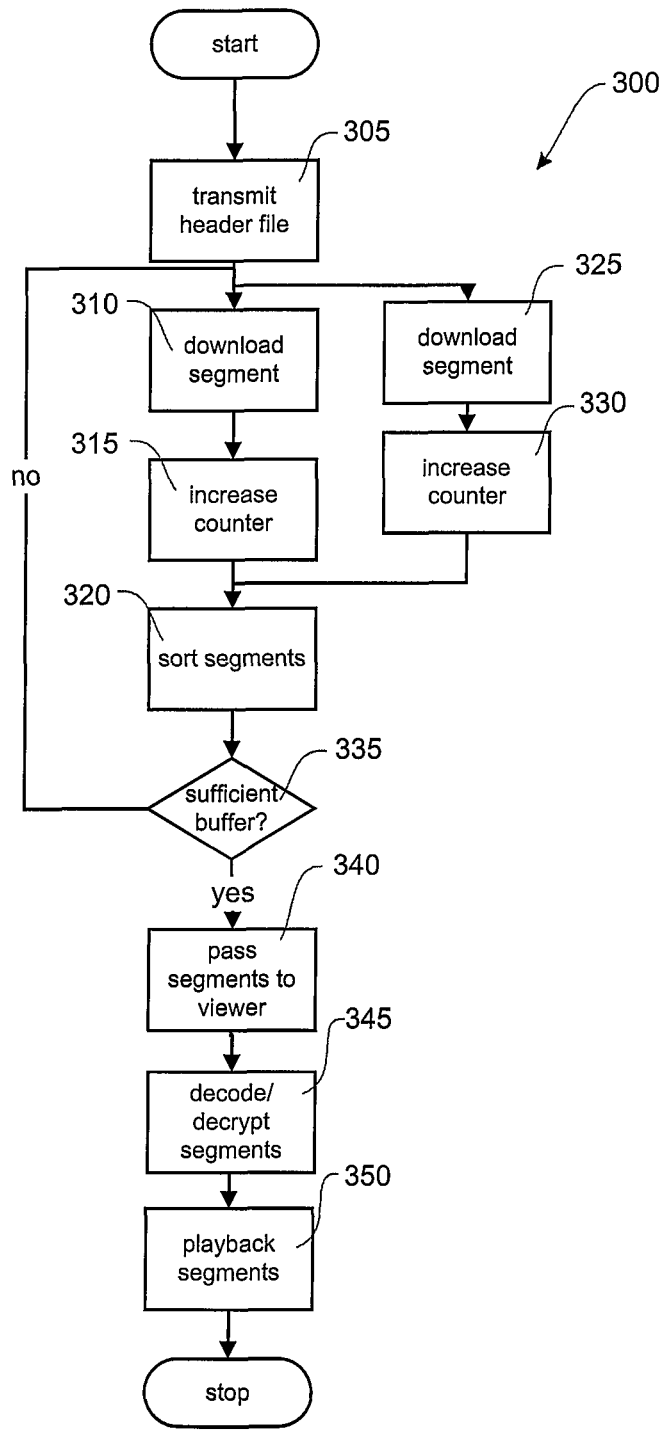
FIG. 3 shows a method of transmitting the modified data file.

Following modification of the data file to generate an output data file described above, the output or modified data file is then transmitted to the remote device 160 over a data network 150. FIG. 3 illustrates a preferred form process 300 for transmitting the modified data file.

The header file is first transmitted 305 from the computing device 115 to the streaming server 170. The header file as described above contains the 4 byte substitution code or codes and the value substituted as well as the number of the segments the file has been broken down to, if this method has been used. The header may also include the type of each segment, any overlay masking information, the number of segments required for download prior to streaming, viewing, playback or use beginning, and any additional form of compression techniques used and the type.

Where used, the streaming server 170 determines the bandwidth or download speed available over the data networks 150 to the remote device 160. The available bandwidth is compared to the relevant information within the header file to determine how many segments of a file are required to be downloaded to enable the segments to be used on the remote device 160 while further segments are transmitted over the data networks 150.

Operating on the remote device 160 or streaming server 170 are two or more distinct execution threads. In the method described below two threads are referred to as ThreadOdd and ThreadEven. ThreadOdd handles downloading of odd numbered segments and ThreadEven handles downloading of even numbered segments.

ThreadOdd and ThreadEven are primarily designed to download odd and even segments in the method described below. However, in some cases ThreadOdd will download even numbered segments and ThreadEven will download odd numbered segments.

When a particular segment has finished downloading, the controlling thread, either ThreadOdd or ThreadEven, allows the downloading of the next segment. Both ThreadOdd and ThreadEven execution threads operate concurrently. This increases the amount of data that may be downloaded via a network connection.

The first data segment is transmitted or downloaded 310 to the remote device 160.

After the segment has been transmitted, the value of a segment counter is increased 315. In one preferred form the counter is increased not just by one but by the segment number within the sequence of ordered data segments. The counter is examined to determine when buffering is complete and playback can commence.

It is possible that segments are downloaded at different speeds. Increasing the counter by the segment number prevents for example segments 1, 2, 3 and 5 being downloaded and sent to the viewer. As the counter is increased the segments are sorted 320 into order.

Steps 310 and 315 represent ThreadOdd which are the odd numbered segments. Also operating concurrently is ThreadEven that downloads even numbered segments. ThreadEven downloads segments 325 and increases the counter 330 by the segment number.

Once a sufficient number of segments 335 have been downloaded this establishes a sufficient buffer. The sorted downloaded segments are passed 340 to viewer 165 for decoding and/or decrypting 345 and viewing, playback or use 350 by the user.

Once streaming, playback, viewing or use has started then the first segment is read into an array in memory. Once in memory the file is decoded/decrypted as indicated by the header file. In practice the decoding and decrypting is a reversal of the modifications for compressing and indexing described above with reference to FIG. 2. The process is applied to each segment. The files are preferably stored in an encoded or encrypted state in storage associated with the streaming server 170 and/or remote device 160. Only in random access memory are they in a native format.

The process may include an additional step for low quality or low bit rate video files. This step involves the playback of the video through frame grabbing software where each frame is copied to a jpg or bmp file type at the same rate of frames per second as an original video file. Each frame has image clean up algorithms passed across it prior to being passed to the viewer for playback.

The image clean up algorithms average out the colour spread across a number of pixels and remove the pixilation usually associated with low quality imagery. Again this occurs in memory in either the streaming server 170 or remote device 160.

The streaming server is a software driven virtual server on remote device 160. The local streaming server 170 is a web server connected via a non standard port. The port is determined when the program loads and can be adjusted by the program if needed to prevent conflicts within the operating system environment. When a video is chosen and the buffer requirement is satisfied the native format media is presented to the local streaming server once the playback window makes a request to the local streaming server.

When the request for content arrives, the local streaming server checks to make sure the entire segment needed, in this case segment 1, has been downloaded. If this segment has been downloaded then it is delivered to the viewer 165 for playback. Once the segment has been delivered the streaming thread then checks that the next segment is ready for download and prepared for delivery and then feeds this segment to the local streaming server.

The procedure continues throughout the delivery process until all segments are fed to the local streaming server. Segments may be deleted once they are fed to the local streaming server but this behaviour is modifiable depending on the local requirements.

If the local streaming server determines that the required segment is not ready for delivery, the connection is maintained with the playback window but no data is sent. Such an event appears to the user as a pause in playback. During this time additional content delivery can be implemented so that the viewer receives other streaming feeds while buffering is accomplished until sufficient media is ready for the delivery process. Once sufficient material is ready for streaming, playback resumes. The amount of data that the viewer chooses to buffer is of no concern to the local streaming server as data is provided to the viewer as quickly as the viewer can receive it. The viewer behaves as if it is being supplied data in the current normal way.

The process described above has the potential to supply near DVD quality video over a one megabit or 128 kilobyte connection with a short initial buffering period. This buffering period varies depending on the amount of data required for the initial periods of the video. For a 150 minute movie with a large number of scene changes at the beginning of the movie, downloaded at approximately 92 kilobytes per second, there is a 90 second buffering period before playback commences.

Figure 4:
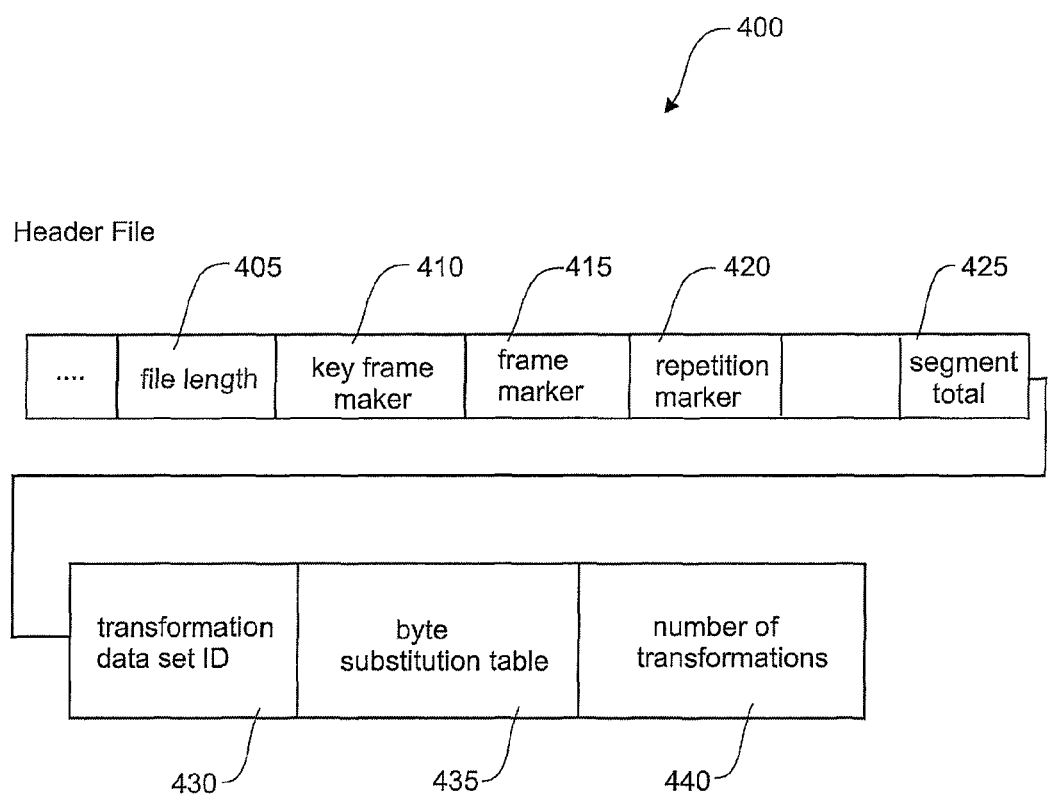
FIG. 4 illustrates a preferred form header file.

FIG. 4 shows a preferred form header file following file modification described above. The preferred form header file 400 includes file length value 405. File length value represents the length of the original data file in bytes added to the header file as described above with reference to 215.

Key frame marker 410 is one of the three unique 4 byte sequences that identifies a key frame. Frame marker 415 is the second unique 4 byte sequence that identifies frame information for example I, B or P pictures or frames. Repetition marker 420 is the third unique 4 byte sequence that signals run length encoding of the data immediately following the repetition market.

Where the data file has been segmented the total number of segments is represented as segment total 425.

Where data transformations have been applied to individual segments or data files the header file will include further data values. These data values include a transformation data set identifier 430. This value is relevant for the first data compression technique described above. In the technique the identifier 430 uniquely identifies the transformation data set that has been applied to data.

Where byte substitution has been performed in accordance with the second preferred form data compression technique described above, the header file will include byte substitution table 435. It is envisaged that the byte substitution table will be approximately 512 bytes in length. It will contain the most repeated byte value followed by the second most repeated byte value and so on down to the least repeated byte value.

Where the third performed data compression technique has been applied, the header file will further include the number of data transformations 440 that have been applied to the data file.

Figure 5:
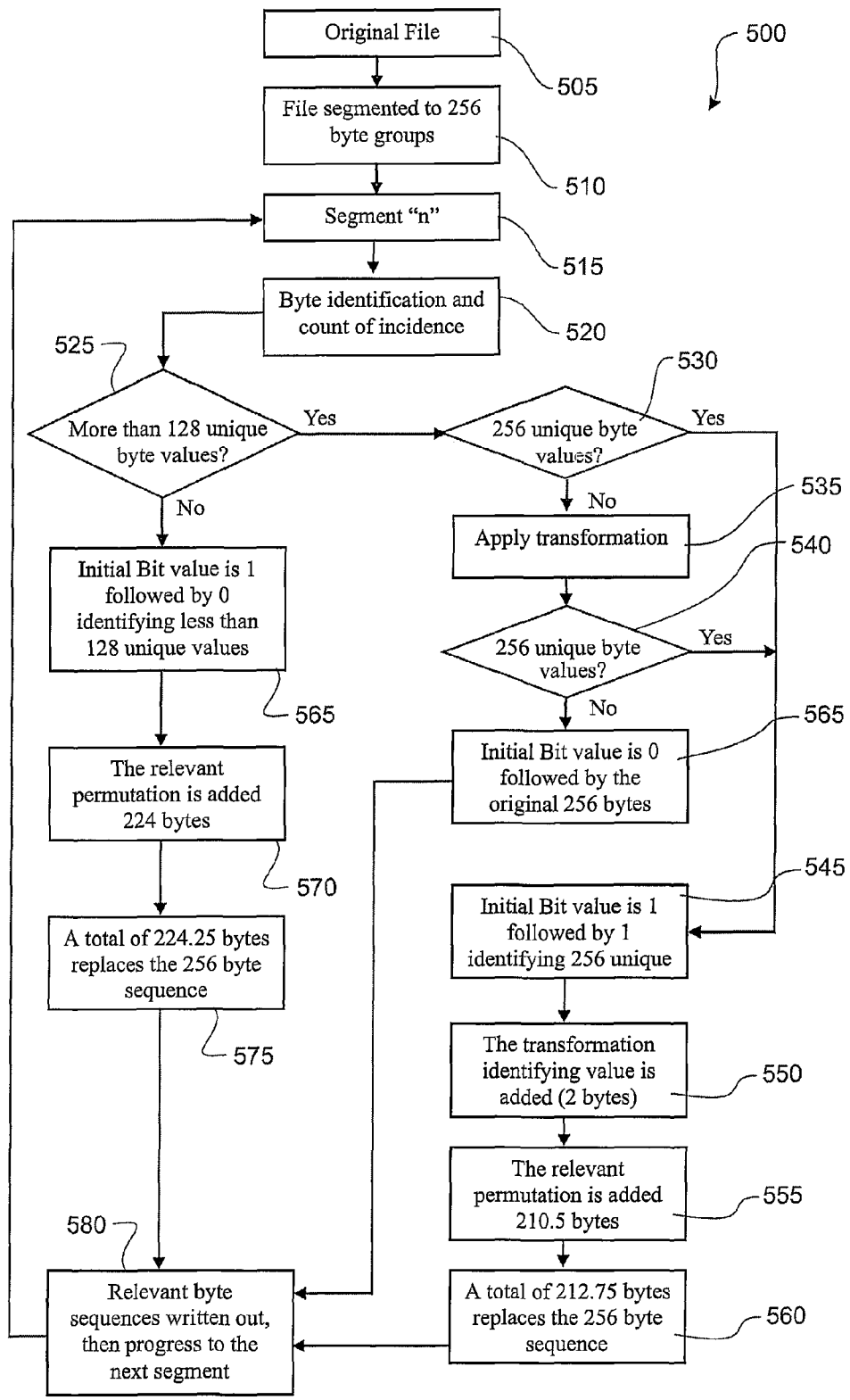
FIG. 5 shows one preferred form data compression technique.

FIG. 5 shows one preferred form data compression technique applied to individual segments or data files. The preferred form technique 500 first receives or obtains access to original file 505. The file is segmented 510 into individual byte groups. Preferably each byte group is no larger than 256 bytes.

Each segment is examined in turn 515. Individual segments are examined to identify the number of unique byte values 520.

If there are more than 128 unique byte values in a segment 525 and further if there are fewer than 256 unique byte values 530 then a transformation is applied 535 to increase the frequency of unique byte values in the block. As described above, a suitable data transformation involves applying one or more transformation data sets or masks to each of the values in the block multiple times. It is envisaged that up to 65,535 different transformation sets are available to be applied to individual blocks. If there are 256 unique byte values 540 following transformation then in the output data file an initial bit value is set 545 to 1. The next bit value in the output file is also set to 1. The second bit value identifies that there are 256 unique byte values within the output data file. The transformation identifier is then added 550 to the output data file. It is expected that the transformation identifier is approximately two bytes in length.

If 256 unique values can be achieved in an individual block, then the relevant permutation is written back or added 555 to the data file. It is expected that this permutation is approximately 210.5 bytes in length.

It is expected that a total of 212.75 bytes replaces 560 the 256 byte sequence.

If after applying a transformation 535 there are not 256 unique byte values then the initial bit value of the output data file is set to zero as shown at 565. The original 256 bytes are then added to the data file.

If there are fewer than 128 unique byte values 525 following byte identification 520 then the initial bit value of the output data file is set to 1 as shown at 565. The bit value immediately following 1 is the value zero which signifies that there are fewer than 128 unique values. The relevant permutation is added 570 to the data file which it is expected will be approximately 224 bytes in length. In this case a total of 224.25 bytes replaces 575 the 256 byte sequence.

Relevant byte sequences are written out following application of the method as indicated at 580. The next segment is then processed 515.

Figure 6:
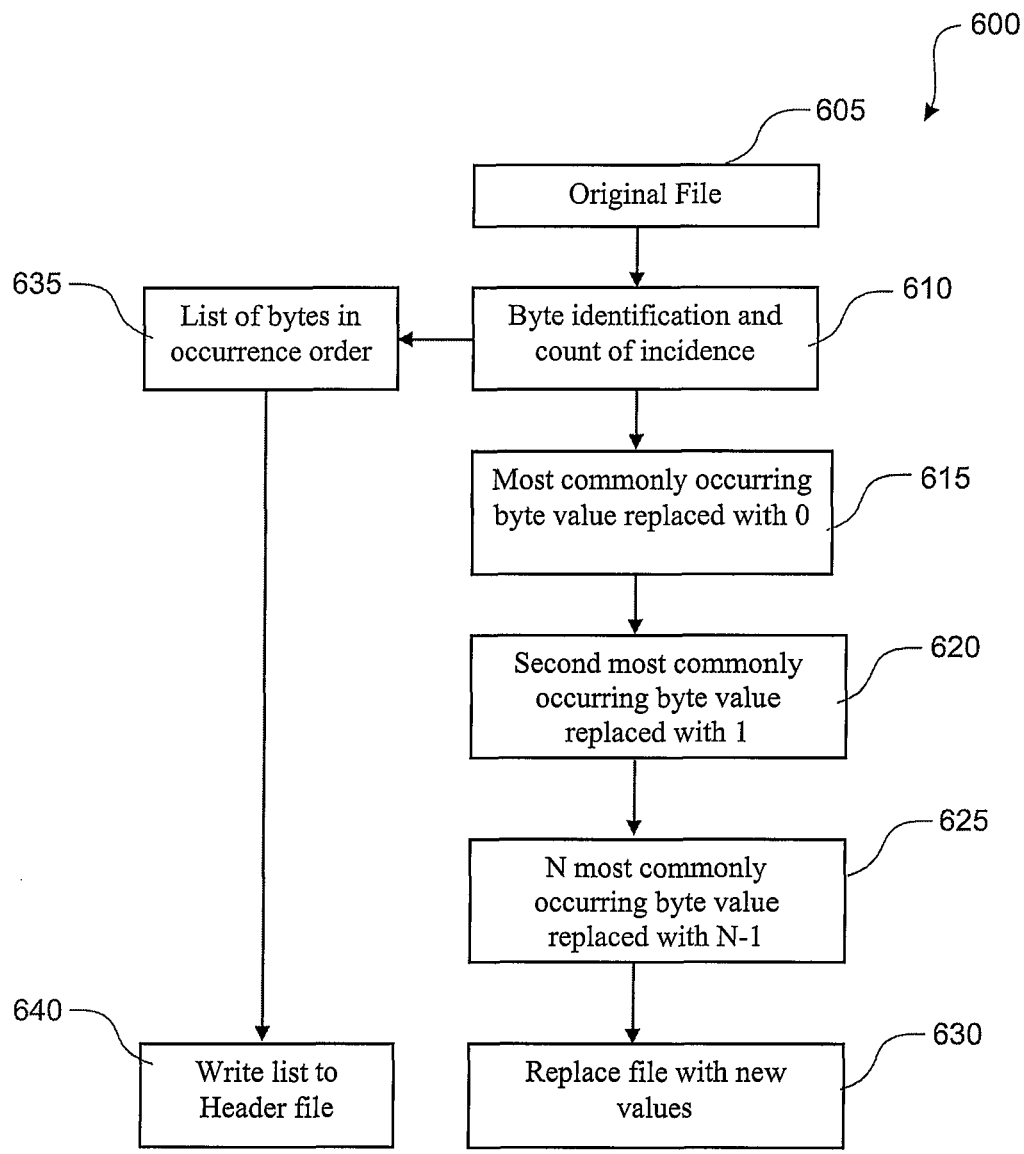
FIG. 6 shows a further preferred form data compression technique.

Referring to FIG. 6, a second data compression technique can be applied to one or more of the segments. The technique 600 receives 605 or obtains access to the original file. The entire segment is scanned and the number of occurrences of each byte value is retained 610. The most commonly occurring byte value is replaced with 0 as indicated at 615.

The second most commonly appearing byte value is replaced with the value "1" as shown at 620. This is repeated in a general case so that the "N" most commonly occurring byte values are respectively replaced with respective N−1 values as indicated at 625.

The new output file is created by replacing the file with the new values 630.

A table is created of bytes in occurrence order 635 and this table or list is written to the header file 640.

Figure 7:
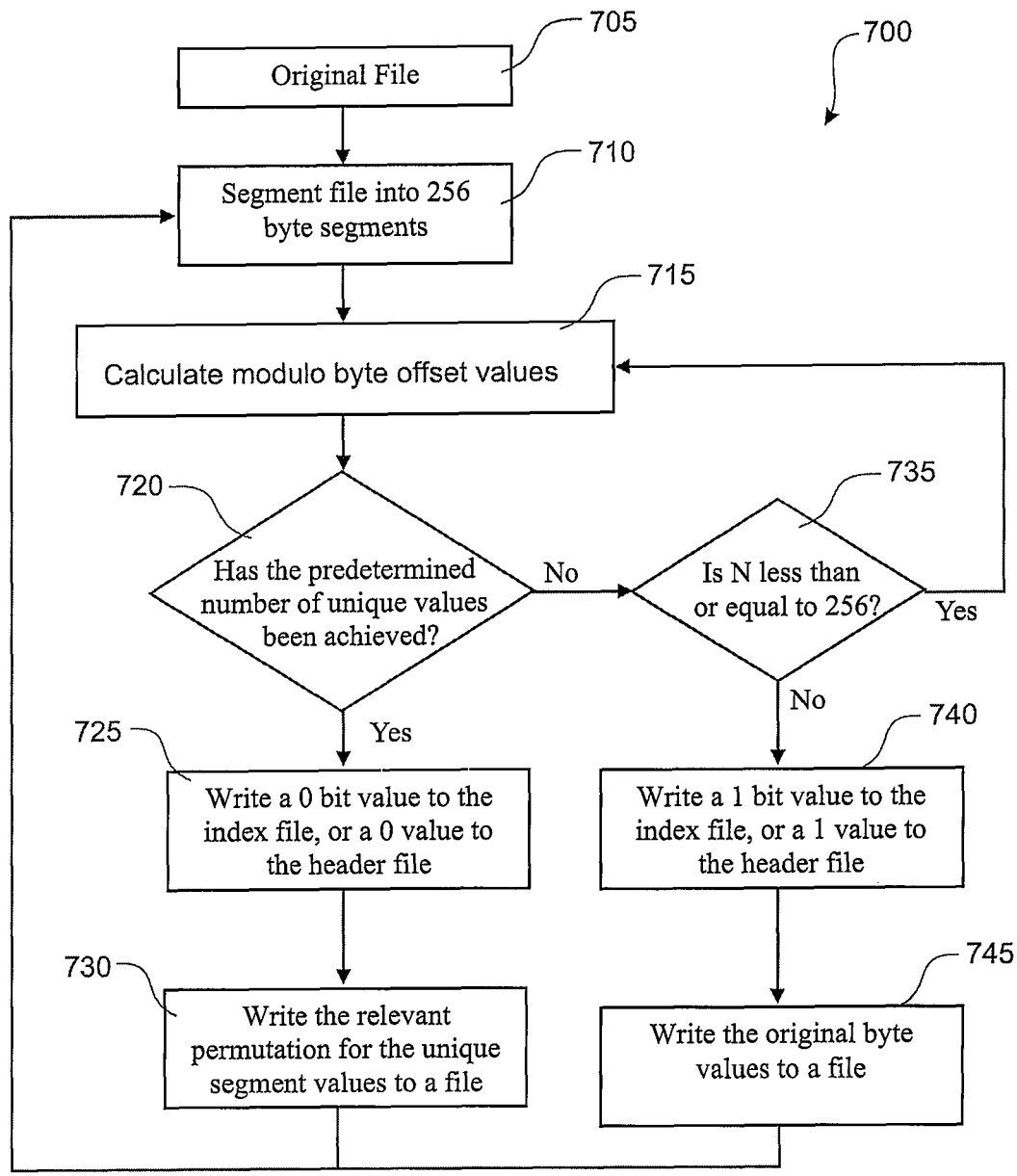
FIG. 7 shows a yet further preferred form data compression technique.

FIG. 7 shows a third preferred form data compression technique described above with reference to FIG. 2. The first step of the technique 700 is to receive or have access to original file 705. The file is segmented 710 into 256 byte segments. As described above the segmentation is either actual or virtual.

The next step is to calculate 715 modulo byte offset values. Assuming that an individual segment contains N bytes then new byte values $b_1 \ldots _n$ are calculated as follows:

$$b_n = b_n + (n-1) \text{modulo } 256$$

where n is in the range 1 to N.

Where N=256, the first byte value has 0 added to it, the second has 1 added etc until the $256^{th}$ value has 255 added to it. New values are calculated by using modulo 256. This ensures that the newly calculated byte value or offset can not exceed 255.

This may also be applied to various bit lengths. The above case includes 8 bits or 1 byte having 256 values. Alternatively the number of bits could be 7 bits where modulo 128 would be used. Another alternative is 10 bits where modulo 1024 would be used. Smaller sets of bytes, for example 180 bytes (8 bit) could also be used. Modulo 256 would be used for the values, but n would be in the range 1 to 180.

The byte sequence is scanned and a count of the number of unique byte values is made. If a predetermined number of unique byte values has been achieved 720 then a 0 bit value is written to the index file. Alternatively a 0 value is written to the header file 725.

The relevant permutation for unique segment values is then written 730 to file.

If a predetermined number of unique values has not been achieved then if N is less than or equal to 256 then the value of N is added to the byte number N 715. Alternatively if N is greater than 256 then a 1 bit value is written to the index file, the original byte values are written to the file. Alternatively a value of 0 is written to the header file, the modified byte values are written to the file.

The foregoing describes the invention including preferred forms thereof. Modifications and improvements as would be obvious to those skilled in the art are intended to be incorporated in the scope hereof, as defined by the accompanying claims.

The invention claimed is:

1. A method of streaming a data file to a remote device over a data network, the data file comprising a plurality of ordered data segments having associated respective numerical ordinal values and a header file, the header file including a segment frequency value representing the number of segments in the data file, the method comprising:
   transmitting the header file to the remote device over the data network;
   transmitting the first data segment of the plurality of ordered data segments over the data network to the remote device at the request of a first execution thread, operating on the remote device, concurrently with the second or subsequent data segments;
   transmitting the second data segment of the plurality of ordered data segments over the data network to the remote device at the request of a second execution thread, operating on the remote device, concurrently with the first or subsequent data segments;
   transmitting the subsequent data segments over the data network to the remote device at the request of the next available first or second execution threads, which operate concurrently;
   increasing the value of a counter value on the remote device to the numerical ordinal value associated with the data segment most recently transmitted over the data network following the complete transmission of each data segment; and
   sorting each transmitted data segment into order at the remote device based on the counter value following the complete transmission of each data segment, and wherein the number of segments in the data file is greater than the number of execution threads, on the remote device.

2. A method according to claim 1 wherein the data file represents a video data file.

3. A method according to claim 2 further comprising the step of playing one or more data segments of the video data file to a user of the remote device while transmitting further data segments of the video data file over the data network.

4. A method according to claim 3 wherein the header file comprises a buffer number, the buffer number representing a threshold number of data segments to be received by the remote device before playback of the one or more received data segments of the video data file can commence, and the method further comprising the step of commencing playback of the one or more data segments of the video data file once the buffer number of data segments received is reached.

5. A method according to claim 4 wherein the method further comprises determining whether a sufficient buffer of data segments has been received based on the buffer number and commencing playback of the video data file on the remote device if the sufficient buffer has been received by reading the received data segments into an array in memory for playback by a viewer on the remote device.

6. A method according to claim 5 wherein the header file further comprises information required for decompression of the data file or data segments at the remote device, and wherein the step of commencing playback of the video data file comprises decompressing the received data segments based on the decompression information in the header file.

7. A method according to claim 5 wherein the header file further comprises information required for decryption of the data file or data segments at the remote device, and wherein the step of commencing playback of the video data file comprises decrypting the received data segments based on the decryption information in the header file.

8. A method according to claim 1 further comprising the step of applying a data compression technique to the data file or one or more data segments of the data file and wherein the header file further comprises information required for decompression of the data file or data segments at the remote device.

9. A method according to claim 8 wherein the data compression technique includes a data transformation that increases the number of unique byte values in at least part of one or more of the data segments.

10. A method according to claim 1 further comprising the step of applying an encryption technique to the data file or one or more data segments of the data file and wherein the header file further comprises information required for decryption of the data file or data segment at the remote device.

11. A method according to claim 1 wherein the data file is a single data file in which the individual data segments are defined by offsets within the data file, and wherein the method further comprises extracting each data segment prior to transmission from the data file by reading from the offsets within the data file.

12. A method according to claim 1 wherein the individual data segments of the data file are maintained as separate data files.

13. A method according to claim 1 wherein the remote device comprises one or more additional execution threads, and wherein the method comprises transmitting the remaining subsequent data segments over the data network to the remote device at the request of the next available first, second, or one or more additional execution threads, which all operate concurrently.

14. A method according to claim 1 wherein the numerical ordinal values associated with the ordered data segments are integer values, and wherein the first execution thread is configured to request transmission of data segments having associated numerical ordinal values that are odd, and the second execution thread is configured to request transmission of data segments having associated numerical ordinal values that are even.

15. A data file streaming system operable to stream a data file to a remote device over a data network, the data file comprising a plurality of ordered data segments having associated respective numerical ordinal values and a header file, the header file including a segment frequency value representing the number of segments in the data file, the system comprising a processor and associated memory which stores readable instructions for execution by the processor to:
transmit the header file to the remote device over the data network;
transmit the first data segment of the plurality of ordered data segments over the data network to the remote device at the request of a first execution thread, operating on the remote device, concurrently with the second or subsequent data segments;
transmit the second data segment of the plurality of ordered data segments over the data network to the remote device at the request of a second execution thread, operating on the remote device, concurrently with the first or subsequent data segments;
transmit the subsequent data segments over the data network to the remote device at the request of the next available first or second execution thread, which operate concurrently;
increase the value of a counter value on the remote device to the numerical ordinal value associated with the data segment most recently transmitted over the data network following complete transmission of each data segment; and
sort each transmitted data segment into order at the remote device based on the counter value following complete transmission of each data segment, and wherein the number of segments in the data file is greater than the number of execution threads on the remote device.

16. A data file streaming system according to claim 15 wherein the data file represents a video data file.

17. A data file streaming system according to claim 16 wherein the processor is further configured to play one or more data segments of the video data file to a user of the remote device while transmitting further data segments of the video data file over the data network.

18. A data file streaming system according to claim 17 wherein the header file comprises a buffer number, the buffer number representing a threshold number of data segments to be received by the remote device before playback of the one or more received data segments of the video data file can commence, and the processor being further configured to commence playback of the one or more data segments of the video data file once the buffer number of data segments received is reached.

19. A data file streaming system according to claim 18 wherein the processor is further configured to determine whether a sufficient buffer of data segments has been received based on the buffer number and to commence playback of the video data file on the remote device if the sufficient buffer has been received by reading the received data segments into an array in memory for playback by a viewer on the remote device.

20. A data file streaming system according to claim 19 wherein the header file further comprises information required for decompression of the data file or data segments at the remote device, and wherein the processor is further configured to decompress the received data segments based on the decompression information in the header file when commencing playback of the video data file.

21. A data file streaming system according to claim 19 wherein the header file further comprises information required for decryption of the data file or data segments at the remote device, and wherein the processor is further configured to decrypt the received data segments based on the decryption information in the header file when commencing playback of the video data file.

22. A data file streaming system according to claim 15 wherein the remote device comprises one or more additional execution threads, and wherein the processor is further configured to transmit the remaining subsequent data segments over the data network to the remote device at the request of the next available first, second, or one or more additional execution threads, which all operate concurrently.

23. A data file streaming system according to claim 15 wherein the numerical ordinal values associated with the ordered data segments are integer values, and wherein the first execution thread is configured to request transmission of data segments having associated numerical ordinal values that are odd, and the second execution thread is configured to request transmission of data segments having associated numerical ordinal values that are even.

24. A method of receiving a streamed data file at a remote device, the data file being sent from a computing device over a data network and the data file comprising a plurality of ordered data segments having associated respective numerical ordinal values and a header file, the header file comprising a segment frequency value representing the number of segments in the data file, the method comprising:
   receiving the header file from the computing device over the data network;
   operating a first execution thread on the remote device to request and receive the first data segment of the plurality of ordered data segments over the data network from the computing device, concurrently with the second or subsequent data segments;
   operating a second execution thread on the remote device to request and receive the second data segment of the plurality of ordered data segments over the data network from the computing device, concurrently with the first or subsequent data segments;
   receiving the remaining subsequent data segments from the computing device over the data network at the request of the next available first or second execution thread, which operate concurrently;
   increasing the value of a counter value on the remote device to the numerical ordinal value associated with the data segment most recently received over the data network from the computing device following the complete reception of each data segment; and
   sorting each received data segment into order on the remote device based on the counter value following complete reception of each data segment.

25. A method according to claim 24 wherein the data file represents a video data file.

26. A method according to claim 25 further comprising the step of playing one or more data segments of the video data file to a user of the remote device while receiving further data segments of the video data file over the data network.

27. A method according to claim 26 wherein the header file comprises a buffer number, the buffer number representing a threshold number of data segments to be received by the remote device before playback of the one or more received data segments of the video data file can commence, and the method further comprising the step of commencing playback of the one or more data segments of the video data file once the buffer number of data segments received is reached.

28. A method according to claim 27 wherein the method further comprises determining whether a sufficient buffer of data segments has been received based on the buffer number and commencing playback of the video data file on the remote device if the sufficient buffer has been received by reading the received data segments into an array in memory for playback by a viewer on the remote device.

29. A method according to claim 28 wherein the header file further comprises information required for decompression of the data file or data segments at the remote device, and wherein the step of commencing playback of the video data file comprises decompressing the received data segments based on the decompression information in the header file.

30. A method according to claim 28 wherein the header file further comprises information required for decryption of the data file or data segments at the remote device, and wherein the step of commencing playback of the video data file comprises decrypting the received data segments based on the decryption information in the header file.

31. A method according to claim 24 wherein the remote device comprises one or more additional execution threads, and wherein the method comprises receiving the remaining subsequent data segments from the computing device over the data network at the request of the next available first, second, or one or more additional execution threads, which all operate concurrently.

32. A method according to claim 24 wherein the numerical ordinal values associated with the ordered data segments are integer values, and wherein the first execution thread is configured to request data segments having associated numerical ordinal values that are odd, and the second execution thread is configured to request data segments having associated numerical ordinal values that are even.

* * * * *